(12) United States Patent
Miyazaki et al.

(10) Patent No.: US 6,674,478 B2
(45) Date of Patent: Jan. 6, 2004

(54) IMAGE PROCESSING APPARATUS, METHOD AND PROVIDING MEDIUM

(75) Inventors: Shinichiro Miyazaki, Kanagawa (JP); Akira Shirahama, Kanagawa (JP); Takeshi Ohno, Saitama (JP)

(73) Assignee: Sony Corporation, Tokyo (JP)

( * ) Notice: Subject to any disclaimer, the term of this patent is extended or adjusted under 35 U.S.C. 154(b) by 66 days.

(21) Appl. No.: 09/365,937

(22) Filed: Aug. 2, 1999

(65) Prior Publication Data

US 2003/0133038 A1 Jul. 17, 2003

(30) Foreign Application Priority Data

Aug. 4, 1998 (JP) .......................................... 10-220020

(51) Int. Cl.⁷ ............................ H04N 11/20; H04N 7/01
(52) U.S. Cl. ...................... 348/441; 348/446; 348/448; 348/558
(58) Field of Search ................................. 348/447, 448, 348/449, 458, 558, 607, 441, 446; H04N 11/20, 7/01, 5/48

(56) References Cited

U.S. PATENT DOCUMENTS

| | | | |
|---|---|---|---|
| 5,274,447 A | | 12/1993 | Nakagaki et al. |
| 5,473,382 A | * | 12/1995 | Nohmi et al. ............... 348/448 |
| 5,933,196 A | * | 8/1999 | Hatano et al. .............. 348/441 |
| 5,963,261 A | * | 10/1999 | Dean .......................... 348/446 |
| 5,963,262 A | * | 10/1999 | Ke et al. ..................... 348/447 |
| 5,990,863 A | * | 11/1999 | Sakamoto ................... 348/448 |
| 6,144,412 A | * | 11/2000 | Hirano et al. ............... 348/441 |
| 6,166,773 A | * | 12/2000 | Greggain et al. ........... 348/448 |
| 6,184,935 B1 | * | 2/2001 | Iaquinto et al. ............. 348/441 |
| 6,219,104 B1 | * | 4/2001 | Shirahama et al. ......... 348/458 |

FOREIGN PATENT DOCUMENTS

| | | |
|---|---|---|
| EP | 0 810 781 | 12/1997 |
| EP | 0 817 482 | 1/1998 |
| EP | 0 854 438 | 7/1998 |
| GB | 2 305 804 | 4/1997 |
| GB | 2 307 127 | 5/1997 |

* cited by examiner

Primary Examiner—John Miller
Assistant Examiner—Trang U. Tran
(74) Attorney, Agent, or Firm—Frommer Lawrence & Haug LLP; William S. Frommer

(57) ABSTRACT

The invention provides an image processing apparatus and method as well as a providing medium by which deterioration of the vertical resolution is prevented and conspicuous appearance of line flickering is suppressed. In order to convert an interlaced video signal having 525 scanning lines into another progressive video signal having 525 scanning lines while maintaining the image size, in an odd-numbered field, a line after conversion is offset by 0.5 H (H is the distance between horizontal scanning lines of the inputted video signal). Consequently, pixel data of each line Oi are produced from pixel data of two lines Ii and Ii+1 before conversion. As a result, pixels of a line on the boundary between white pixels and black pixels have a gray color. In an odd-numbered field, no offset is given, and pixel data of each line I1 of the field before conversion are set as they are as pixel data of each line Oi of the field after conversion. The pixels of the line on the boundary between the white and black pixels become white or gray pixels, and consequently, when compared with an alternative case wherein such pixels on the boundary line are white and black pixels, line flickering is prevented from being observed conspicuously on a display screen.

15 Claims, 14 Drawing Sheets

FIG. 2

| INPUT SIGNAL \ OUTPUT SIGNAL | NON-INTERLACED SIGNAL | INTERLACED SIGNAL | |
|---|---|---|---|
| | | ODD-NUMBERED FIELD | EVEN-NUMBERED FIELD |
| NON-INTERLACED SIGNAL | 0 | 0 | Delta/2 |
| INTERLACED SIGNAL — ODD-NUMBERED FIELD | 0.5 | 0.5 | 0.5+Delta/2 |
| INTERLACED SIGNAL — EVEN-NUMBERED FIELD | 0 | 0 | Delta/2 |

IMAGE PROCESSING APPARATUS, METHOD AND PROVIDING MEDIUM

BACKGROUND OF THE INVENTION

This invention relates to an image processing apparatus and method as well as a providing medium, and more particularly to an image processing apparatus and method as well as a providing medium by which a picture size and a vertical frequency of a video signal can be converted while suppressing line flickering without deterioration of a vertical resolution.

Television broadcasting in Japan is-based on the NTSC color TV system, and television receivers in Japan are usually designed so as to receive and display an interlaced video signal (525i) having 525 scanning lines. Meanwhile, also television receivers which can display an interlaced video signal of 625i of the PAL system, an interlaced video signal of 1080i used for high definition television broadcasting and a non-interlaced video signal of 525p for displaying line sequentially 525 scanning lines begin to be put on the market. If any of video signals of 525i, 625i, 525p and 1080i is inputted to a television receiver of the type mentioned, the television receiver converts the inputted video signal into and displays an image of a predetermined size of a predetermined unified frequency. The unified frequency may be, for example, 525p. In this instance, the horizontal scanning frequency fh is 31 kHz, and the field (frame) frequency fv is 60 Hz.

FIG. 9 shows an example of a configuration of a conventional television receiver of the type described above. Referring to FIG. 9, an A/D converter 1 converts analog video signals Yi1, Ui1 and Vi1 of a first frequency inputted to the television receiver into digital signals and outputs the digital signals to a low-pass filter (LPF) 2. The LPF 2 extracts only predetermined low frequency components from horizontal and vertical frequency components of the signals inputted thereto and outputs the extracted low frequency components to an interpolation circuit 3. The interpolation circuit 3 reduces the image data inputted thereto from the LPF 2 by interpolation calculation and supplies the reduced video signals to a frame memory 4. Writing and reading operations of the frame memory 4 are controlled by a write memory controller 5 and a read memory controller 6, respectively. Another interpolation circuit 7 converts data read out from the frame memory 4 into video data of a greater screen and outputs the resulting video data to a mixing (Mix) circuit 15.

Processes similar to those performed by the components from the A/D converter 1 to the interpolation circuit 7 are performed also for other video signals Yi2, Ui2 and Vi2 by a different set of components from an A/D converter 8 to another interpolation circuit 14 which are similar to the components from the A/D converter 1 to the interpolation circuit 7, respectively.

The mixing circuit 15 selects outputs of the interpolation circuit 7 or outputs of the interpolation circuit 14 and outputs the selected outputs to a D/A converter 16. The D/A converter 16 converts the video signals inputted thereto in the form of digital signals into analog signals and outputs the analog signals to a display unit such as a cathode ray tube (CRT) not shown.

In operation, the A/D converter 1 converts analog signals inputted thereto into digital signals and outputs the digital signals to the LPF 2. The LPF 2 extracts predetermined low frequency components of the inputted video signals and outputs the low frequency components to the interpolation circuit 3. The interpolation circuit 3 performs a reduction process by linear interpolation if it is required to reduce the inputted video signals, and supplies the reduced video signals to the frame memory 4 so that they may be stored into the frame memory 4. The write memory controller 5 controls the writing process of the reduced video signals into the frame memory 4.

The video signals stored in the frame memory 4 are read out under the control of the read memory controller 6 and supplied to the interpolation circuit 7. The interpolation circuit 7 processes the video signals read out from the frame memory 4 to expand the size of a screen by interpolation processing when necessary, and outputs the video signals of the expanded screen size to the mixing circuit 15.

Similar processing is performed also by the components from the A/D converter 8 to the interpolation circuit 14, and resulting video signals are supplied to the mixing circuit 15.

The mixing circuit 15 selects the video signals inputted from the interpolation circuit 7 or the video signals inputted from the interpolation circuit 14 and outputs the selected video signals to the D/A converter 16. The D/A converter 16 converts the video signals in the form of digital signals into analog signals and outputs the analog signals to the CRT or the like display unit not shown.

The television receiver thus converts, for example, video signals of 1080i, video signals of 525i or video signals of 625i into video signals of 525p in regard to the screen size and the number of scanning lines as seen in FIG. 10 so that the video signal of 525p may be displayed.

FIG. 11 shows an example of a more detailed configuration of a portion of the television receiver shown in FIG. 9 which includes the frame memory 4, write memory controller 5 and read memory controller 6 described above. A digital video signal outputted from the interpolation circuit 3 is inputted to a field memory 34 and a field memory 35 which correspond to the frame memory 4. Also a write side memory control signal (for example, an enable signal) supplied from a circuit not shown is supplied to the field memory 34 and the field memory 35. A switch 33 is switchable to a contact "a" side or a contact "b" side in response to the write side field switching signal supplied thereto from a circuit not shown.

Also a read side memory control signal (enable signal) is supplied to the field memory 34 and the field memory 35 through another switch 37. The switch 37 is switchable to a contact "a" side or a contact "b" side in response to the read side field switching signal outputted from a D-type flip-flop 32. Also a further switch 36 is switchable to a contact "a" side or a contact "b" side in response to the read side field switching signal and outputs a vide signal read out from the field memory 34 or the field memory 35 to the interpolation circuit 7.

The D-type flip-flop 32 latches the write side field switching signal in response to a read side readout start pulse detected by and outputted from a start position detection circuit 31 and outputs the latched write side field switching signal as a read side field switching signal to the switch 36 and the switch 37.

Operation of the circuit shown in FIG. 11 is described with additional reference to time charts of FIGS. 12A through 12E.

The switch 33 is switched to the contact "a" side in response to a level change of the write side field switching signal (FIG. 12B) to the high level, but switched to the contact "b" side in response to a level change of the write side field switching signal to the low level. A write side line address count signal (FIG. 12A) is supplied to the field memory 34 when the write side field switching signal (FIG. 12B) has the high level, but is supplied to the field memory 35 when the write side field switching signal has the low level. As a result, a digital video signal supplied from the interpolation circuit 3 is written into the field memory 34 when the write side field switching signal (FIG. 12B) has the high level, but is written into the field memory 35 when the write side field switching signal has the low level.

On the other hand, the write side field switching signal (FIG. 12B) is latched by the D-type flip-flop 32 in synchronism with a read side readout start pulse (FIG. 12D) outputted from the start position detection circuit 31 and is supplied as a read side field switching signal (FIG. 12E) to the switch 36 and the switch 37. The switch 36 and the switch 37 are switched to the contact "b" side when the read side field switching signal (FIG. 12E) has the high level, but are switched to the contact "a" side when the read side field switching signal (FIG. 12E) has the low level. A read side line address count signal (FIG. 12C) is supplied to the field memory 35 when the read side field switching signal (FIG. 12E) has the high level. As a result, a video signal read out from the field memory 35 is supplied to the interpolation circuit 7 through the contact "b" of the switch 36.

Similarly, when the read side field switching signal (FIG. 12E) has the low level, the read side line address count signal (FIG. 12C) is supplied to the field memory 34. Consequently, a video signal read out from the field memory 34 is supplied to the interpolation circuit 7 through the contact "a" of the switch 36.

In this manner, in the circuit shown in FIG. 11, for example, in order to convert an interlaced video signal of 625i (fh=15 kHz, fv=50 Hz) into a non-interlaced signal of 525p (fh=31 kHz, fv=60 Hz), one field processing is performed in order to prevent line flickering from being observed conspicuously on a display screen. In particular, upon writing, when an odd-numbered field of an nth frame is written into the field memory 34, a video signal of an odd-numbered field of the next n+1th frame is written into the field memory 35.

Similarly, when an interlaced signal of 525i (fh=15.734 kHz, fv=60 Hz) or 625i (fh=15.625 kHz, fv=50 Hz) is set as a video signal to be outputted, where the input signal is a video signal of 625i or 525i, since vertical frequency conversion is involved, one field processing is performed in order to prevent line flickering from being observed conspicuously on a display screen.

However, where one field processing is performed in this manner, an image signal of one of an odd-numbered field and an even-numbered field is utilized from the image data of the two fields, and this results in deterioration of the vertical resolution. As a result, for example, an oblique straight line is displayed not as a smooth straight line but as a notched uneven line.

Also it is a possible idea to perform both field processing in place of one field processing. However, both field processing gives rise to a phenomenon wherein line flickering is observed conspicuously on a display screen.

In particular, when conversion of a vertical frequency, for example, from 60 Hz into 50 Hz is involved, if it is tried to perform the conversion so that fields of 60 Hz may correspond in a one-by-one corresponding relationship to fields of 50 Hz, a so-called passing phenomenon wherein a video signal of each field is displayed at a time later than a time at which it should originally be displayed occurs due to the difference in frequency.

In order to prevent such passing, for example, the same field is repetitively outputted periodically as seen from FIG. 14. In the outputting manner shown in FIG. 14, a video signal of the same field is outputted twice successively for each 6 fields. This particularly makes line flickering appear conspicuously on a display screen.

More particularly, in such a case that all of pixels of five lines from the first to fifth of an odd-numbered field are black and all pixels of lines below the fifth line are white as seen in FIG. 15, since a line of an even-numbered field is positioned between lines of the odd-numbered field, the pixels of the four lines from the first to the fourth are black and the pixels of the lines below them are white.

If the pixels of the lines of the odd-numbered field and the even-numbered field are used as pixels of lines of each field (frame) of the non-interlaced display, then the pixels of the five lines from above in the odd-numbered field are black, but the pixels of the four lines from above in the even-numbered field are black. As a result, when the images of the even-numbered field and the odd-numbered field are displayed alternately, then the black pixels and the white pixels of the same still image are displayed alternately on the fifth line from above. Such alternate display of the black pixels and the white pixels is observed as line flickering of the frequency of 30 Hz.

Although line flickering occurs also where no conversion of a vertical frequency is involved, where conversion of a vertical frequency is involved, line flickering appears particularly conspicuously because the frequency with which line flickering occurs is lower than that where conversion of a vertical frequency is not involved.

SUMMARY OF THE INVENTION

It is an object of the present invention to provide an image processing apparatus and method as well as a providing medium by which conspicuous appearance of line flickering can be suppressed without deterioration of the vertical resolution.

In order to attain the object described above, according to an aspect of the present invention, there is provided an image processing apparatus, comprising discrimination means for discriminating a relationship between a video signal inputted and a video signal to be outputted, supply means for supplying a predetermined initial value in response to a result of the discrimination of the discrimination means, generation means for generating a predetermined coefficient using the initial value supplied thereto from the supply means, and calculation means for calculating pixel data of the video signal to be outputted from pixel data of the inputted video signal using the coefficient generated by the generation means.

According to another aspect of the present invention, there is provided an image processing method, comprising a discrimination step of discriminating a relationship between a video signal inputted and a video signal to be outputted, a supply step of supplying a predetermined initial value in response to a result of the discrimination in the discrimination step, a generation step of generating a predetermined coefficient using the initial value supplied in the supply step, and a calculation step of calculating pixel data of the video signal to be outputted from pixel data of the inputted video signal using the coefficient generated in the generation step.

According to a further aspect of the present invention, there is provided a providing medium which provides a computer-readable program for causing an information processing apparatus to execute a process comprising the steps of a discrimination step of discriminating a relationship between a video signal inputted and a video signal to be outputted, a supply step of supplying a predetermined initial value in response to a result of the discrimination in the discrimination step, a generation step of generating a predetermined coefficient using the initial value supplied in the supply step, and a calculation step of calculating pixel data of the video signal to be outputted from pixel data of the inputted video signal using the coefficient generated in the generation step.

In the image processing apparatus, image processing method and providing medium, a coefficient is produced using an initial value produced based on a relationship between a video signal inputted and another video signal to be outputted, and pixel data of the video signal to be outputted are calculated from pixel data of the inputted video signal making use of the generated coefficient. Consequently, deterioration of the vertical resolution can be prevented by both-field processing, and line flickering can be suppressed from being observed conspicuously on a display screen.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a table illustrating a relationship between a combination of an input signal with an output signal and an offset;

DESCRIPTION OF THE PREFERRED EMBODIMENT

Before a preferred embodiment of the present invention is described, in order to make clear a corresponding relationship between various features recited in the claims and elements of the embodiment of the present invention described below, the features of the present invention are described below together with the corresponding elements to which reference symbols denoting them are added in parentheses following them. However, this description provides a mere example and does not signify that the features of the present invention be limited to the recited elements.

Figure 1:
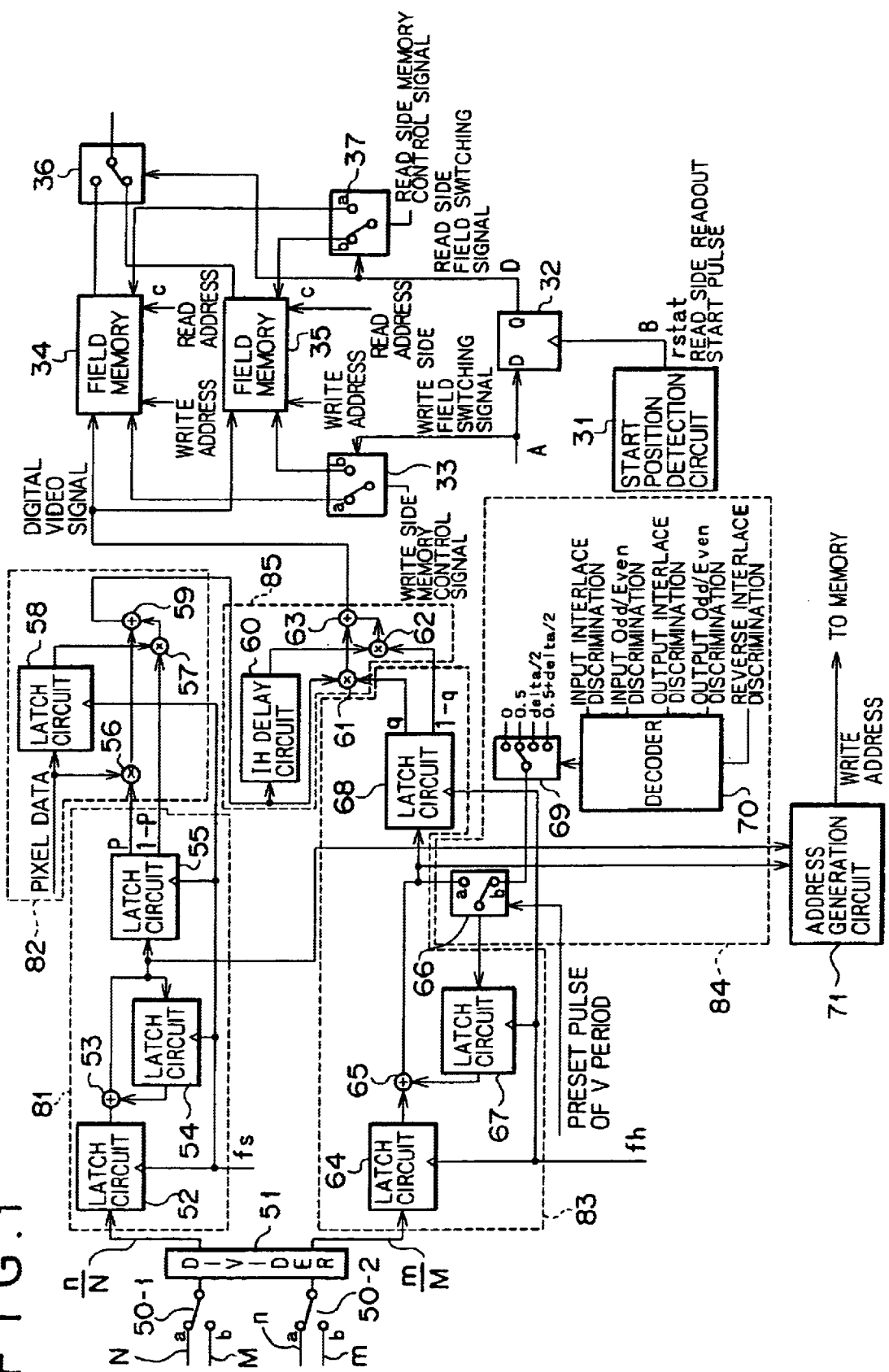
FIG. 1 is a block diagram showing a configuration of an image processing apparatus to which the present invention is applied.

An image processing apparatus as set forth in claim 1 comprises discrimination means (for example, a decoder 70 of FIG. 1) for discriminating a relationship between a video signal inputted and a video signal to be outputted, supply means (for example, a switch 69 of FIG. 1) for supplying a predetermined initial value in response to a result of the discrimination of the discrimination means, generation means (for example, a vertical interpolation coefficient generation circuit 83 of FIG. 1) for generating a predetermined coefficient using the initial value supplied thereto from the supply means, and calculation means (for example, a vertical linear interpolation circuit 85 of FIG. 1) for calculating pixel data of the video signal to be outputted from pixel data of the inputted video signal using the coefficient generated by the generation means.

The image processing apparatus as set forth in claim 2 further comprises storage means (for example, field memories 34, 35 of FIG. 1) for storing the pixel data calculated by the calculation means, and control means (for example, switches 33, 37 of FIG. 1) for controlling writing and reading out of the pixel data into and from the storage means.

Figure 11:
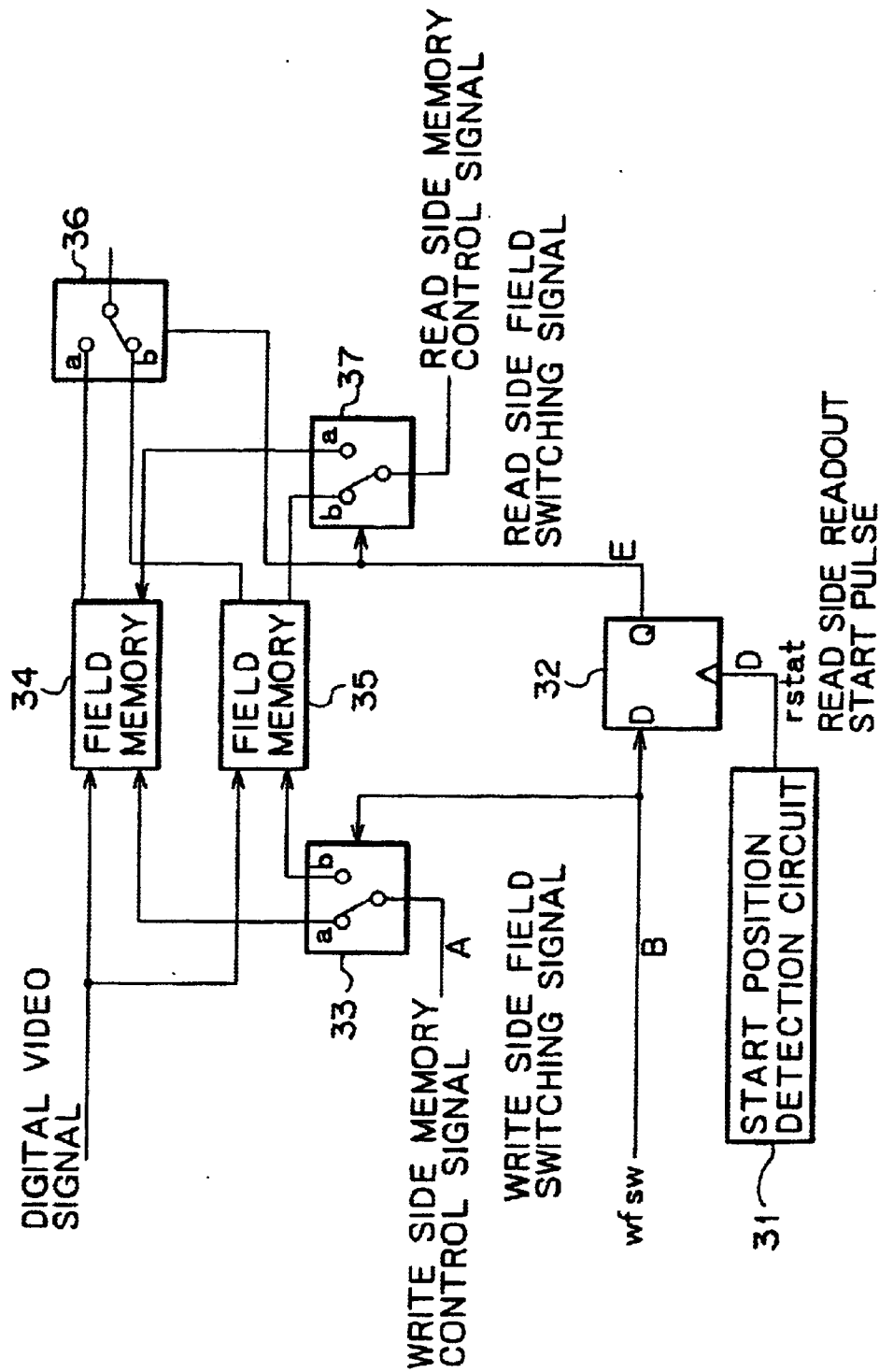
FIG. 11 is a block diagram showing a more detailed configuration of components of the image processing apparatus of FIG. 9 including a frame memory, a write memory controller and a read memory controller.
Figure 12:
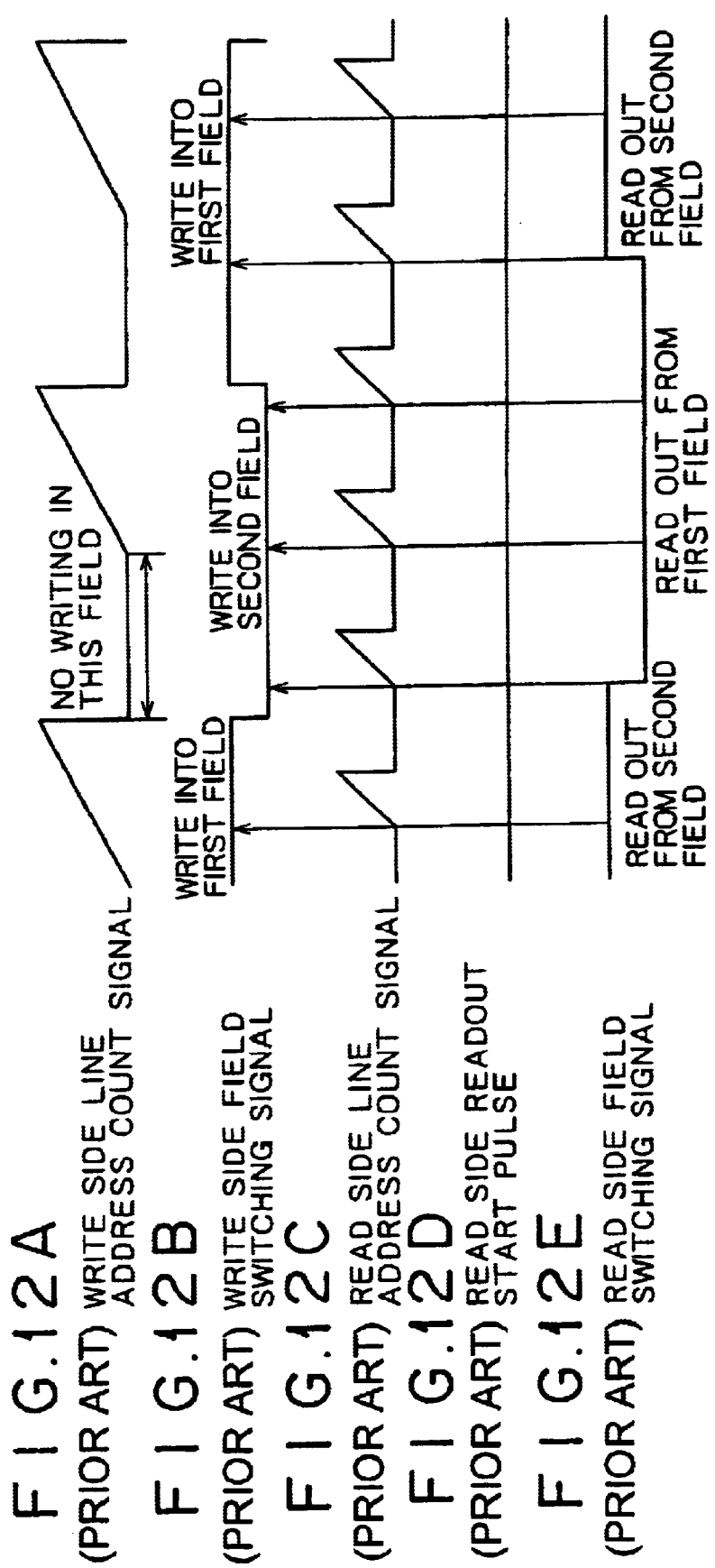
FIGS. 12A through 12E are timing charts each illustrating operation of the circuit shown in FIG. 11.
Figure 13:
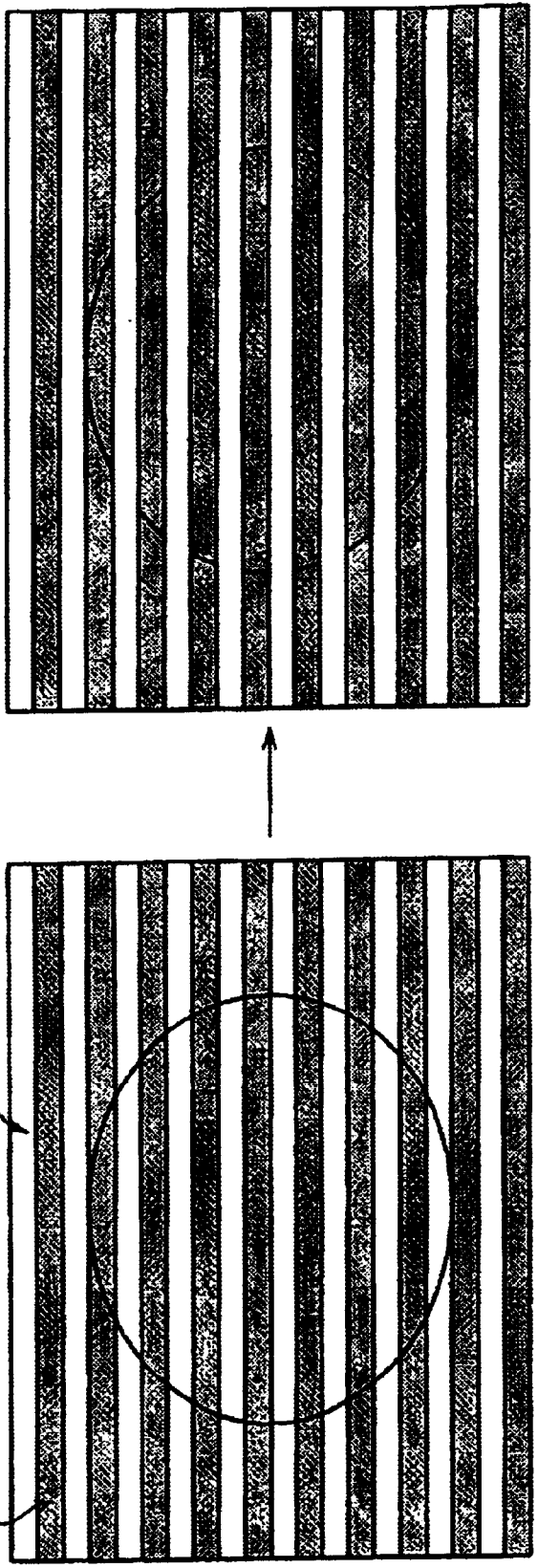
FIG. 13 is a schematic view illustrating deterioration of the vertical resolution by one field processing.
Figure 14:
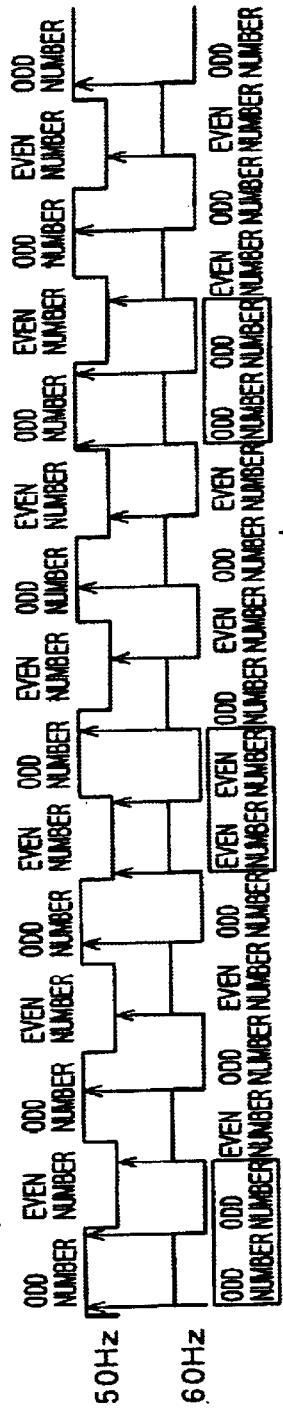
FIG. 14 is a waveform diagram illustrating passing preventing processing.

FIG. 1 is a block diagram showing a configuration of an image processing apparatus to which the present invention is applied. In FIG. 1, those components of the image processing apparatus which correspond to the components of the apparatus shown in FIG. 11 are denoted by the same numerals as those in FIG. 11 and their explanation is omitted.

Figure 9:
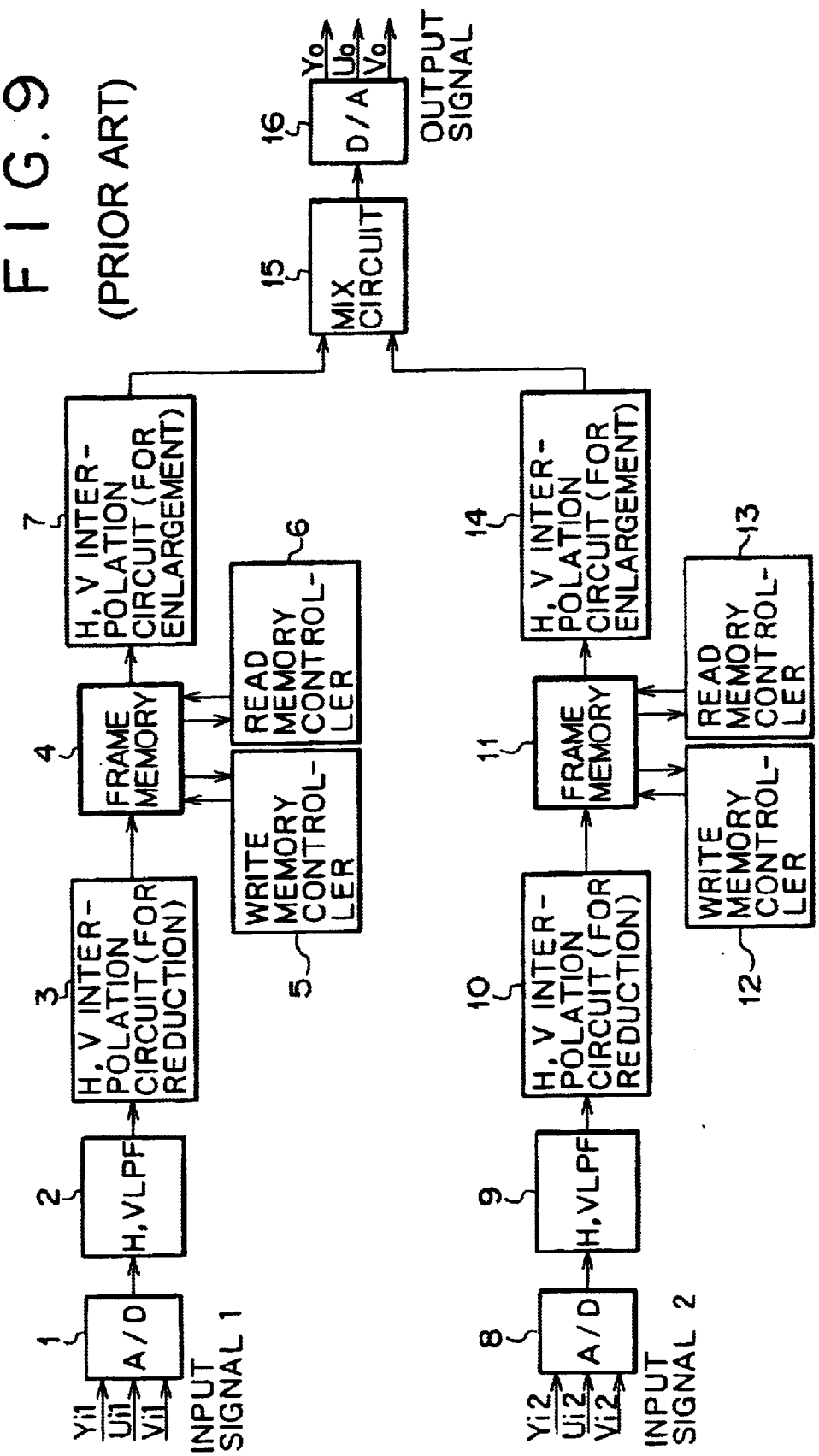
FIG. 9 is a block diagram showing a configuration of a conventional image processing apparatus.
Figure 10:
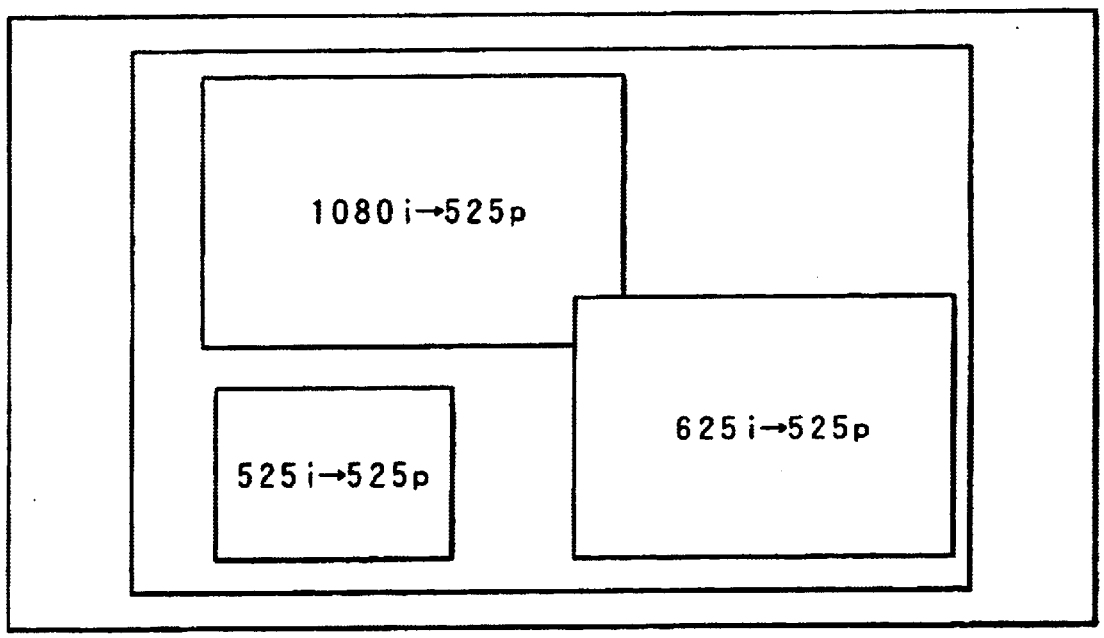
FIG. 10 is a schematic view illustrating conversion in number of scanning lines and conversion between an interlaced display and a non-interlaced display.

The configuration in FIG. 1 is a portion of the configuration including the interpolation circuit 3, frame memory 4, write memory controller 5 and read memory controller 6 of the apparatus described hereinabove with reference to FIG. 9, and the other details of the image processing apparatus are similar to those described hereinabove with reference to FIG. 9. It is to be noted that also the interpolation circuit 10, frame memory 11, write memory controller 12 and read memory controller 13 are designed in a similar manner to those shown in FIG. 1.

In the arrangement shown in FIG. 1, the number of horizontal pixels N after conversion is inputted from a contact "a" of a switch 50-1 to a divider 51, and the number of vertical pixels M after conversion is inputted from another contact "b" of the switch 50-1 to the divider 51. Further, the number of horizontal pixels n of a video signal before conversion is inputted to a contact "a" of another switch 50-2 and the number of vertical pixels m of the video signal before conversion is inputted from a contact "b" of the switch 50-2 to the divider 51. These numbers of the pixels N and M are inputted from a CPU or some other suitable apparatus not shown. The divider 51 calculates a reciprocal n/N of an enlargement ratio N/n in a horizontal direction and supplies the reciprocal n/N to a latch circuit 52 of a horizontal interpolation coefficient generation circuit 81. The divider 51 further calculates a reciprocal m/M of an enlargement ratio M/n in a vertical direction and supplies the reciprocal number m/M to a latch circuit 64 of a vertical interpolation coefficient generation circuit 83.

The latch circuit 52 supplies a latched value to an adder 53. The adder 53 adds the value inputted thereto from the latch circuit 52 and another value inputted thereto from another latch circuit 54, and outputs the sum to a further latch circuit 55 and the latch circuit 54. A sampling clock signal of a frequency fs is supplied to the latch circuits 52, 54 and 55.

The latch circuit 55 normalizes the value inputted thereto from the adder 53 and subtracts a resulting value p from 1 to obtain a difference (1−P), and outputs the value p and the difference (1−P) to a multiplier 56 and a multiplier 57 of a horizontal linear interpolation circuit 82, respectively. The multiplier 56 multiplies pixel data of a video signal inputted from the LPF 2 (pixel data before conversion) by the value p (horizontal interpolation coefficient) inputted thereto from the latch circuit 55, and outputs a resulting product to an adder 59. The multiplier 57 multiplies the pixel data delayed by a one clock interval by a latch circuit 58 by the difference value (1−P) (horizontal interpolation coefficient) outputted from the latch circuit 55, and outputs a resulting product to the adder 59. The adder 59 adds the outputs of the multiplier 56 and the multiplier 57 and outputs the sum to a 1H delay circuit 60 and a multiplier 61 of a vertical linear interpolation circuit 85.

Meanwhile, in the vertical interpolation coefficient generation circuit 83, an adder 65 adds a value latched in the latch circuit 64 and a value latched in another latch circuit 67 and supplies the sum to a latch circuit 68. Further, the adder 65 outputs the sum also to the latch circuit 67 through a contact "a" of a switch 66 of an initial value setting circuit 84. The latch circuit 68 normalizes the value inputted thereto from the adder 65 to obtain a value q (vertical interpolation coefficient) and subtracts the value q from 1 to obtain a difference (1−q) (vertical interpolation coefficient), and outputs the value q and the difference (1−q) to the multiplier 61 and another multiplier 62 of the vertical linear interpolation circuit 85, respectively.

In the vertical interpolation coefficient generation circuit 83, a horizontal frequency clock of a frequency fh is inputted to clock terminals of the latch circuits 64, 67 and 68.

Five different signals are inputted from a circuit not shown to a decoder 70 of the initial value setting circuit 84. In particular, an input interlace discrimination signal representative of whether an inputted video signal is an interlaced signal or a non-interlaced signal, an input odd/even discrimination signal representative of whether the field of an inputted video signal is an odd-numbered field or an even-numbered field, an output interlace discrimination signal representative of whether the video signal to be outputted is an interlaced signal or a non-interlaced signal, an output odd/even discrimination signal representative of whether the field of a video signal to be outputted is an odd-numbered field or an even-numbered field, and a reverse interlace discrimination signal representative of whether, when the field of a video signal inputted is an odd-numbered field, also the field of a video signal to be outputted is an odd-numbered field (or whether, when the field of an inputted video signal is an even-numbered field, also the field of a video signal to be outputted is an even-numbered field) or, when the field of an inputted video signal is an even-numbered field, the field of a video signal to be outputted is an odd-numbered field (or, when the field of an inputted video signal is an odd-numbered field, the field of a video signal to be outputted is an even-numbered field) are inputted to the decoder 70 of the initial value setting circuit 84.

The decoder 70 refers to such a table as shown in FIG. 2 based on the discrimination signals inputted thereto to determine an offset value and outputs a control signal to a switch 69 to select the thus determined offset value. The switch 69 selects one of values 0, 0.5, delta/2 and 0.5+delta/2 as an offset value in response to the control signal from the decoder 70 and supplies the selected offset value as an initial value to the latch circuit 67 through the contact "b" of the switch 66. The switch 66 is switched to the contact "b" side once for one field in response to a preset pulse of a field period.

As seen from FIG. 2, in order to convert a non-interlaced signal into another non-interlaced signal, the offset is set to 0. In order to convert a non-interlaced signal into an interlaced signal, the offset value is set to 0 when the field of a video signal to be outputted is an odd-numbered field, but is set to Delta/2 when the field of a video signal to be outputted is an even-numbered field. Here, Delta represents a reciprocal (=the number of vertical lines after conversion/the number of vertical lines before conversion) of a rate of change in vertical size (=the number of vertical lines after conversion/the number of vertical lines before conversion). For example, when a video signal of 625p is converted into another video signal of 525i, since the numbers of effective lines of the individual video signals are 576 and 480, respectively, Delta=576/480=288/240=6/5=1.2.

In order to convert an interlaced signal into a non-interlaced signal, when a video signal inputted is of an odd-numbered field, the offset value is set to 0.5 (the distance between horizontal scanning lines of the inputted video signal is 1), but when the inputted video signal is of an even-numbered field, the offset value is set to 0.

In order to convert an interlaced signal into another interlaced signal, when fields of the input and output signals correspond to each other, that is, when an odd-numbered field is to be converted into another odd-numbered field and an even-numbered field is to be converted into another even-numbered field, the offset value is set to 0.5 for an odd-numbered field, but is set to Delta/2 for an even-numbered field. On the other hand, in order to convert an odd-numbered field of an inputted interlaced signal into an interlaced signal of an even-numbered field, the offset value is set to 0.5+Delta/2, but in order to convert an even-numbered field of an inputted interlaced signal into an interlaced signal of an odd-numbered field, the offset value is set to 0.

In the vertical linear interpolation circuit 85, the multiplier 61 multiplies data inputted from the adder 59 of the horizontal linear interpolation circuit 82 by the value q (vertical interpolation coefficient) inputted from the latch circuit 68 of the vertical interpolation coefficient generation circuit 83 and outputs the product to an adder 63. The 1H delay circuit 60 delays the data inputted from the adder 59 by 1H (one period of horizontal scanning lines) and outputs the delayed data to the multiplier 62. The multiplier 62 multiplies the data inputted from the 1H delay circuit 60 by the value 1−q (vertical interpolation coefficient) inputted from the latch circuit 68 of the vertical interpolation coefficient generation circuit 83, and outputs the product to the adder 63. The adder 63 adds the value inputted from the multiplier 61 and the value inputted from the multiplier 62 and outputs the sum to the field memory 34 and the field memory 35.

A write side memory control signal is supplied from a circuit not shown to the field memory 34 or the field memory 35 through the contact "a" or the contact "b" of the switch 33. The switch 33 is switched in response to a write side field switching signal supplied thereto from a circuit not shown.

Also a read side memory control signal supplied from a circuit not shown is supplied to the field memory 34 or the field memory 35 through the contact "a" or the contact "b" of the switch 37. The data read out from the field memory 34 or the field memory 35 are outputted to the interpolation circuit 7 in the following stage through the contact "a" or the contact "b" of the switch 36.

The start position detection circuit 31 generates a read side readout start pulse and supplies it to a clock terminal of the D-type flip-flop 32. The D-type flip-flop 32 latches a write side field switching signal supplied to a terminal D thereof from a circuit not shown in synchronism with the read side readout start pulse and outputs it as a read side field switching signal from a terminal Q thereof to the switch 36 and the switch 37.

An address generation circuit 71 detects the position of a pixel on each line from an output of the horizontal interpolation coefficient generation circuit 81 and detects the position of a horizontal scanning line in a vertical direction from the output of the adder 65 of the vertical interpolation coefficient generation circuit 83. Then, the address generation circuit 71 generates a write address corresponding to the thus detected positions and outputs it to the field memory 34 and the field memory 35.

In operation, when the switches 50-1 and 50-2 are connected to the contact "a" side, the number of horizontal pixels N after conversion and the number of horizontal pixels n before conversion are inputted to the divider 51. The divider 51 divides the number of horizontal pixels n by the number of horizontal pixels N and outputs a resulting value to the latch circuit 52 of the horizontal interpolation coefficient generation circuit 81. Similarly, when the switches 50-1 and 50-2 are connected to the contact "b" side, the number of vertical pixels M after conversion and the number of vertical pixels m before conversion are inputted to the divider 51. The divider 51 divides the number of vertical pixels m by the number of vertical pixels M and supplies a resulting value to the latch circuit 64 of the vertical interpolation coefficient generation circuit 83.

The latch circuit 52 of the horizontal interpolation coefficient generation circuit 81 latches the value n/N inputted thereto in synchronism with a sampling clock signal and outputs the latched value to the adder 53. The adder 53 outputs the value inputted thereto to the latch circuit 54. The value latched by the latch circuit 54 is supplied to the adder 53 and added to the value inputted from the latch circuit 52 by the adder 53. The operation described is executed repetitively each time a sampling clock is inputted, and the adder 53 successively produces such values as n/N, 2n/N, 3n/N, . . . in synchronism with sampling clocks of the frequency fs and outputs the values to the latch circuit 55. The latch circuit 55 outputs a value p obtained by normalization of the value inputted thereto from the adder 53 and a value 1−p obtained by subtracting the value p from 1 as horizontal interpolation coefficients to the multipliers 56 and 57 of the horizontal linear interpolation circuit 82, respectively.

The multiplier 56 of the horizontal linear interpolation circuit 82 multiplies pixel data by the value p and outputs the product to the adder 59. The multiplier 57 multiplies pixel data delayed by a one clock interval by the latch circuit 58, that is, data of another pixel adjacent the pixel inputted to the multiplier 56 on the right side of the same line on a screen, by the horizontal interpolation coefficient 1−P, and outputs the product to the adder 59. The adder 59 adds the values inputted thereto from the multiplier 56 and the multiplier 57. Consequently, pixel data produced by weighting the data of the two pixels adjacent each other on the same line with the horizontal interpolation coefficient p and the horizontal interpolation coefficient 1−p are obtained. The pixel data are outputted to the multiplier 61 and the 1H delay circuit 60 of the vertical linear interpolation circuit 85.

The 1H delay circuit 60 delays the inputted pixel data by an interval equal to 1H and outputs the delayed pixel data to the multiplier 62. As a result, at a timing at which data of one pixel is inputted to the multiplier 61, data of a pixel on a line below is supplied to the multiplier 62. Then, the two pixel data vertically adjacent each other are weighted with the vertical interpolation coefficients q and 1−q inputted from the latch circuit 68 of the vertical interpolation coefficient generation circuit 83 and then added by the adder 63, and the sum is outputted to the field memory 34 and the field memory 35.

The vertical interpolation coefficients to be used by the vertical linear interpolation circuit 85 are generated in the following manner. In particular, the decoder 70 produces a selection signal for selecting one of the four different offset values based on the types of an input video signal and an output video signal using the table in FIG. 2 and outputs the produced selection signal to the switch 69. The switch 69 selects one of the four offset signals in response to the selection signal. The switch 66 is switched to the contact "b" side in a frequency of once per one field, and the offset value outputted from the switch 69 at this timing is set as an initial value to the latch circuit 67.

The adder 65 adds the value m/M latched in the latch circuit 64 and the initial value latched in the latch circuit 67 and outputs the sum. Since the switch 66 is normally connected to the contact "a" side at a timing at which a preset pulse outputted in a frequency of once per one field is not supplied, a value outputted from the adder 65, that is, a value obtained by adding the value latched in the latch circuit 64 to the initial value, is supplied to and latched by the latch circuit 67. Then, this value is supplied to the adder 65 and added to the value supplied from the latch circuit 64 again. Since the operation described is repeated in synchronism with a clock signal of the horizontal scanning frequency fh, such values as initial value+m/M, initial value+2 m/M, initial value+3 m/M, . . . are successively produced from the adder 65. Each of the values produced in this manner is latched by the latch circuit 68, and a value obtained by normalizing the value is supplied as a vertical interpolation coefficient q to the multiplier 61. Further, the value 1−q obtained by subtracting the value q from 1 is supplied as a vertical interpolation coefficient to the multiplier 62. Then, the two pixel data vertically adjacent each other are weighted with the vertical interpolation coefficients by means of the multipliers 61 and 62 and the adder 63 to obtain intended pixel data.

For example, if it is intended to convert a video signal of 525i (interlaced signal) into another video signal of 525p (non-interlaced signal) with a rate of change in vertical size=1, then when the interlaced signal is converted into the non-interlaced signal, the offset value is set to 0.5 for an odd-numbered field of the input signal, but is set to 0 for an even-numbered field of the input signal as seen from FIG. 2.

Figure 3:
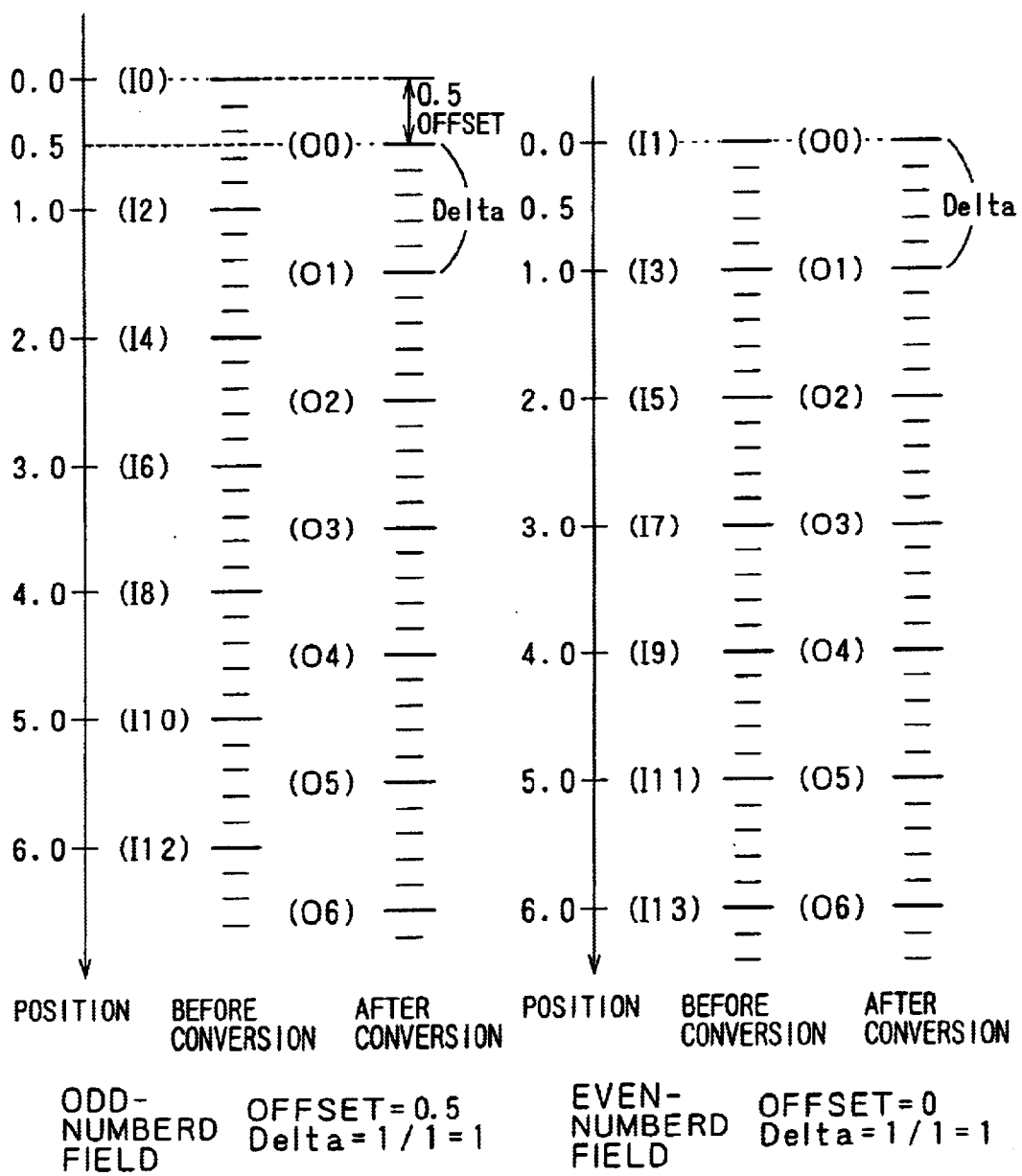
FIG. 3 is a diagrammatic view illustrating a process of converting an interlaced signal into a non-interlaced signal.

Consequently, since the input video signal is offset by 0.5 H (H represents the distance between lines of each field of the input video signal, and H=1 in FIG. 3) beginning with the top line I0 of an odd-numbered field of the input video signal, the first line O0 of the odd-numbered field of the video signal after conversion is positioned just in the middle between the first line I0 and the second line I2 of the odd-numbered field of the inputted video signal. As a result, the vertical interpolation coefficient q produced corresponding to the position is 0.5, and also the vertical interpolation coefficient 1−q is 0.5. Consequently, pixel data of the line O0 are produced with average values of pixels of the line I0 and the line I2. Similarly, since the second line O1 of the video signal after conversion is positioned just in the middle between the line I2 and the line I4 of the video signal before the conversion, pixel data of the line O1 are produced with average values of pixel data of the line I2 and the line I4.

On the other hand, for an even-numbered field, the offset value is 0. As a result, the vertical interpolation coefficient q is 1, and the vertical interpolation coefficient 1−q is 0. Accordingly, pixel data of the first line O0 of the output video signal are produced using the line I1 of the input video signal as it is, and pixel data of the next line O1 are produced from pixel data of the line I3 of the input video signal.

Figure 4:
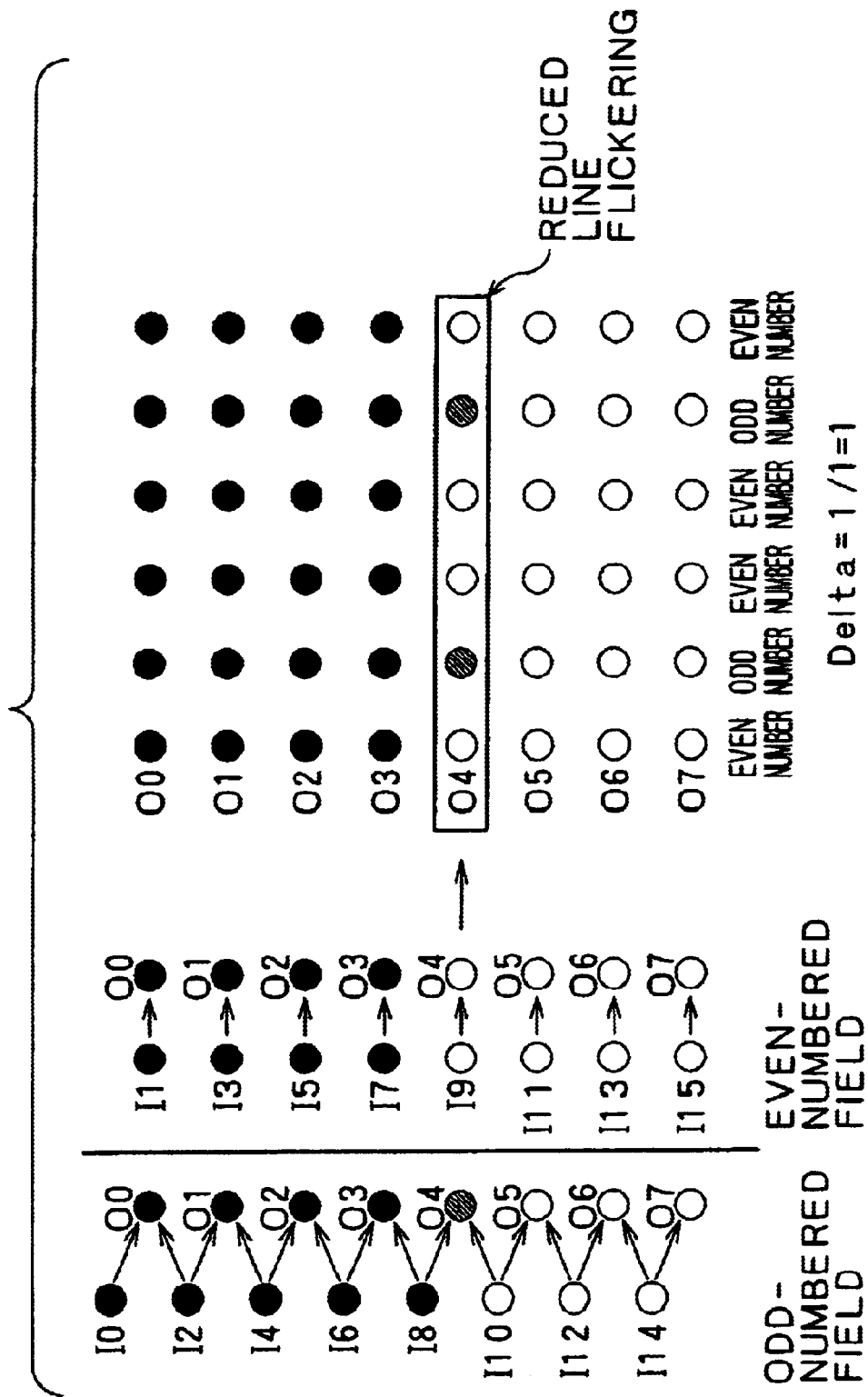
FIG. 4 is a diagrammatic view illustrating line flickering which occurs when an interlaced signal is converted into a non-interlaced signal.

Accordingly, for example, when pixel data of the lines I0 to I8 of the input video signal represent black and pixel data of the line I9 et seq. represent white as seen in FIG. 4, since a line of the signal to be outputted in an odd-numbered field is produced from two upper and lower adjacent lines, the lines O0 to O3 of the video signal to be outputted, which are produced from the lines I0, I2, I4, I6 and I8, are lines of black pixel data while the lines O5 and O6 which are produced from the lines I10, I12 and I14 are lines of white pixel data.

In contrast, pixel data of the line O4 produced from the line I8 of black pixel data and the line I10 of white pixel data are gray pixel data.

On the other hand, in an even-numbered field, the black pixel data of the lines I1, I3, I5 and I7 are determined as they are as pixel data of the lines O0 to O3, and consequently, all of the lines are lines of black pixel data. Meanwhile, also pixel data of the lines O4, O5, O6 and O7 produced from the white pixel data of the lines I9, I11, I13 and I15 are white pixel data.

Figure 15:
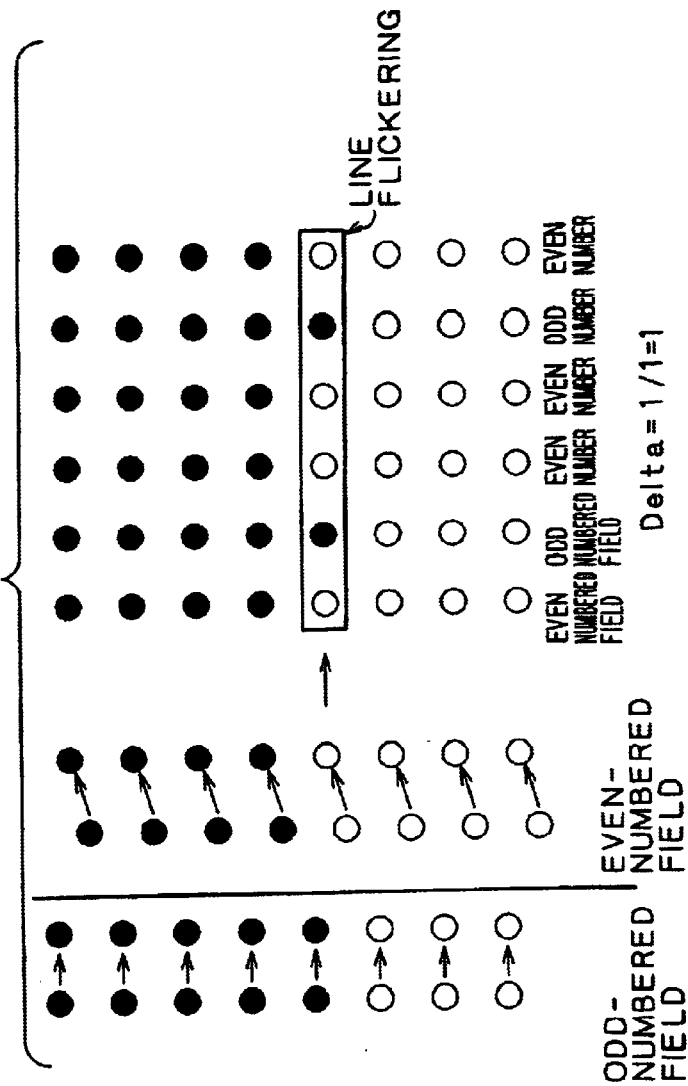
FIG. 15 is a diagrammatic view illustrating occurrence of line flickering.

As a result, when the image of the even-numbered field and the image of the odd-numbered field are displayed alternately, the gray pixel data and the white pixel data are displayed alternately on the line O4. As a result, line flickering appears. However, when compared with the case wherein white pixels and black pixels are displayed as in the case of FIG. 15, even if the pixels of the odd-numbered field and the even-numbered field are displayed successively twice, the line flickering is observed less conspicuously because the gray pixels and the white pixels are displayed alternately.

While the description above with reference to FIGS. 3 and 4 is given of a case wherein the rate of change in vertical size is 1 for simplified description, in order to otherwise convert, for example, a video signal of 625i into another video signal of 525p, since the number of effective scanning lines of the video signal of 625i is 576 and the number of the effective scanning lines of the video signal of 525p is 480, Delta= 576/480=288/240=6/5=1.2.

Figure 5:
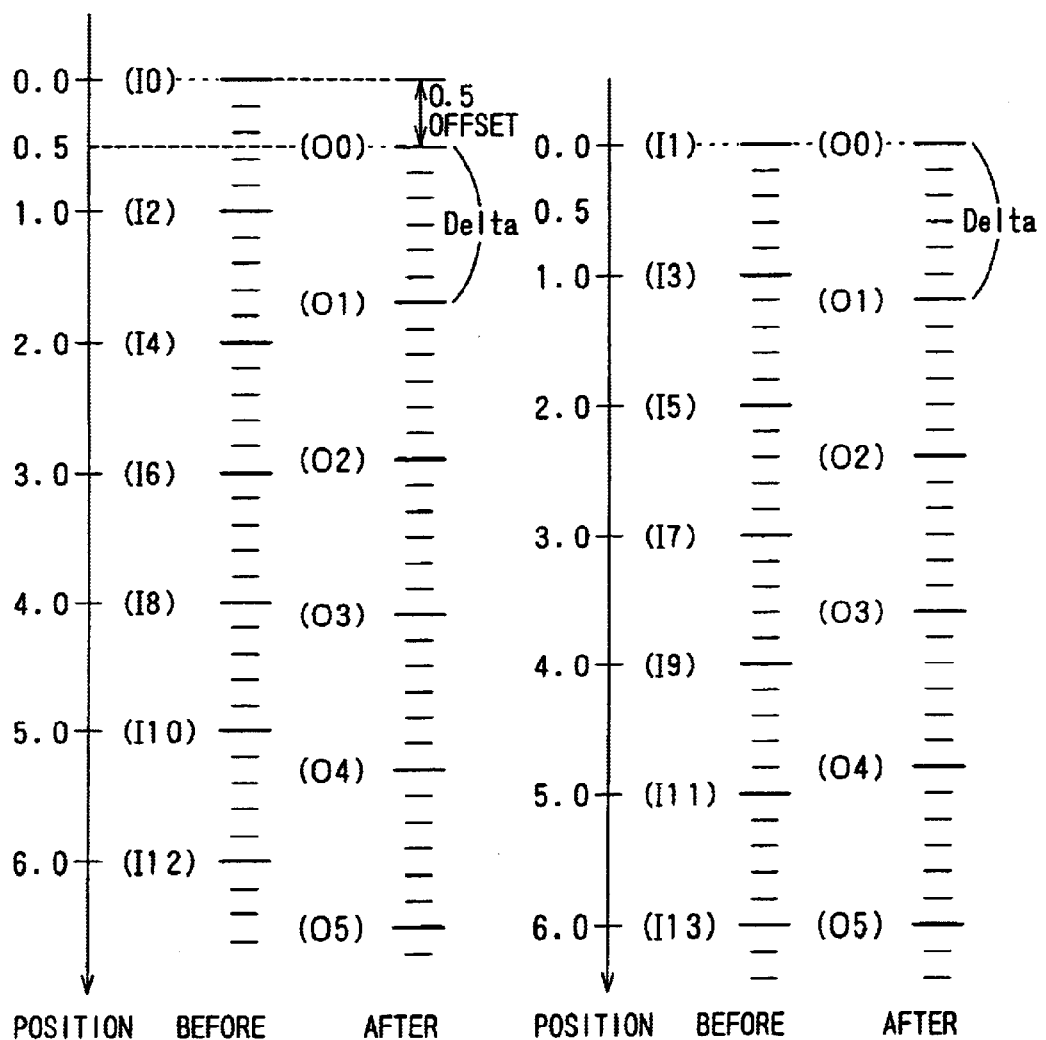
FIG. 5 is a diagrammatic view illustrating a process when an interlaced signal is converted into a non-interlaced signal.

In this instance, since the offset of 0.5 is given for an odd-numbered field, as seen in FIG. 5, pixel data of the first line O0 after conversion are produced with average values of pixel data of the first line I0 and the next line I2 before conversion, and the line O1 next to the line O0 is disposed at a distance of 1.2 from the line O0. Consequently, the distance of the line O1 from the line O2 is 0.7 (=1.2−0.5), and the distance between the line O1 and the line I4 is 0.3 (=1.0−0.7). As a result, pixel data of the line O1 are produced by adding values obtained by weighting the pixel data of the line I2 with 0.3 and values obtained by weighting the pixel data of the line I4 with 0.7.

The line O2 spaced by the distance of 1.2 from the line O1 has a distance of 0.9 (=1.2−0.3) from the line I4 and has a distance of 0.1 (=1.0−0.9) from the line I6. Accordingly, pixel data of the line O2 are produced by adding values obtained by weighting the pixel data of the line I4 with 0.1 and values obtained by weighting the pixel data of the line I6 with 0.9.

In an even-numbered field, since the offset value is 0, the position of the first line O0 after conversion is the same as the position of the first line I1 before the conversion. Accordingly, pixel data of the line O0 are produced from the pixel data of the line O1. The next line O1 having the distance of 1.2 from the line O0 has a distance of 0.2 (=1.2−1.0) from the line I3 and has a distance of 0.8 (=1.0−0.2) from the line I5. Accordingly, pixel data of the line O1 are produced by adding values obtained by weighting the pixel data of the line I3 with 0.8 and values obtained by weighting the pixel data of the line I5 with 0.2.

Since such weighting as described above is involved, for example, such pixel data after conversion formed on the boundary between the lines of black pixels and the lines of white pixels as seen in FIG. 4 are all formed from gray pixels with a higher probability than where they are formed from white pixels and black pixels, and line flickering is observed less conspicuously.

Figure 6:
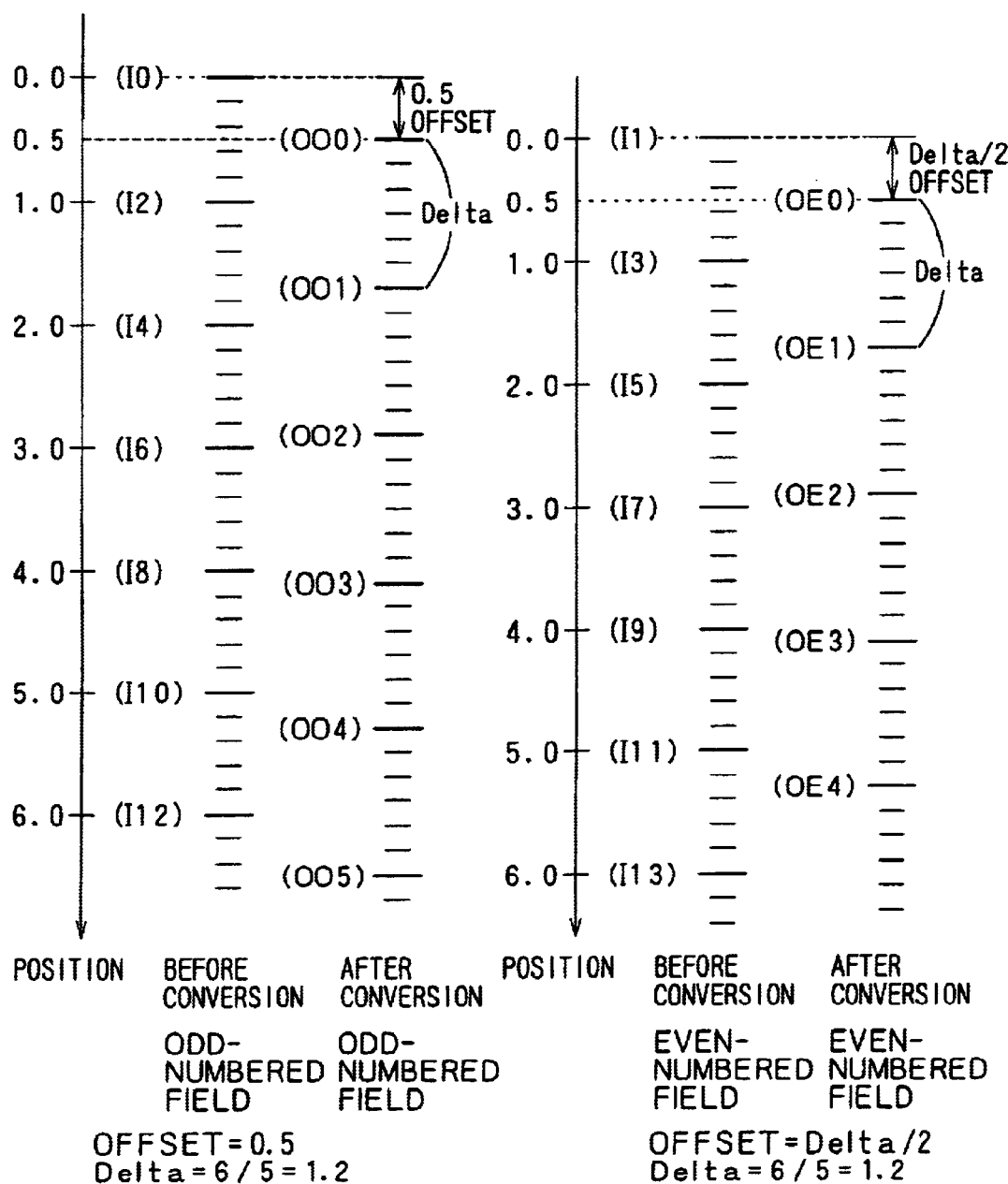
FIG. 6 is a similar view but illustrating another process when an interlaced signal is converted into a non-interlaced signal.
Figure 7:
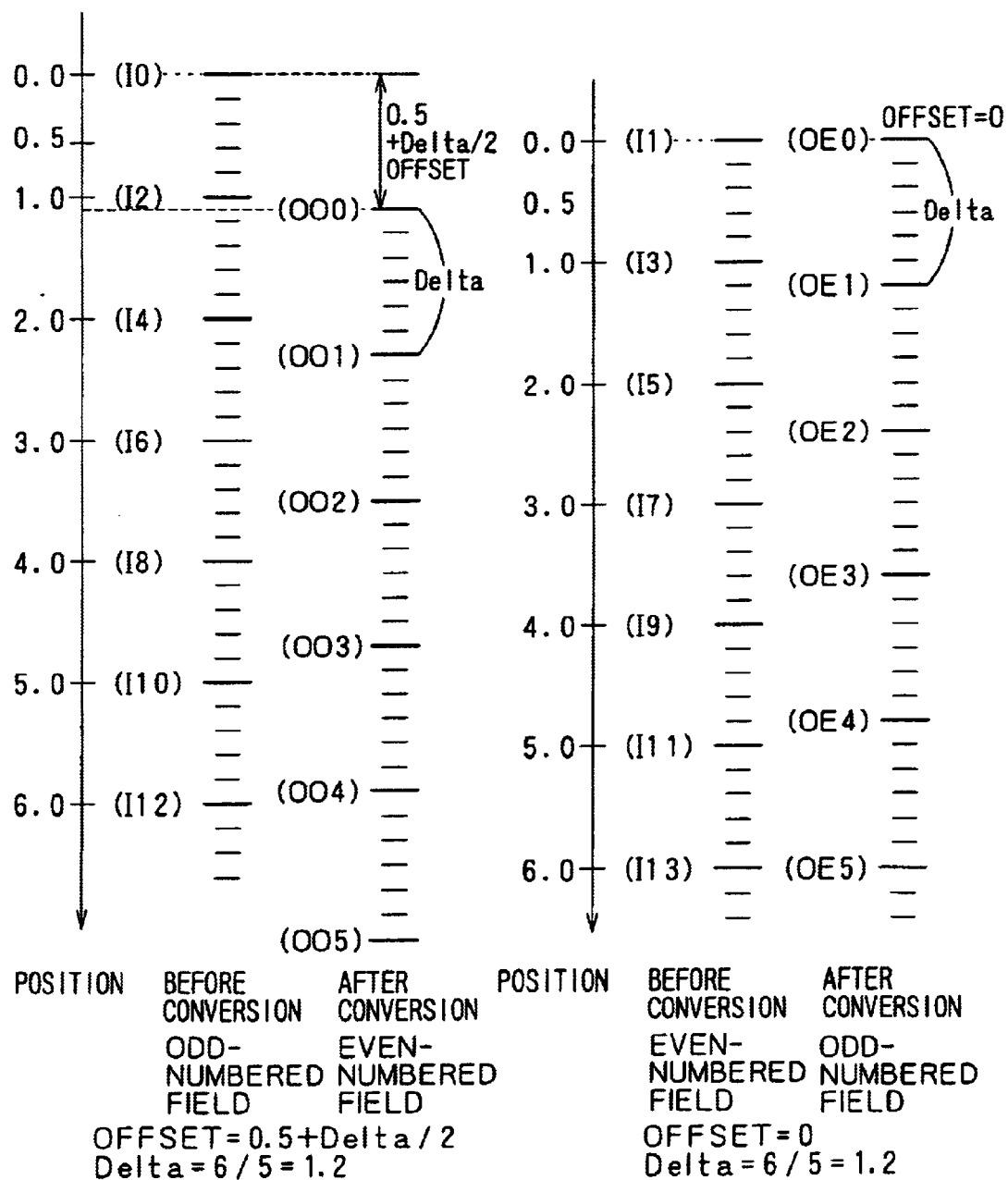
FIG. 7 is a similar view but illustrating a further process when an interlaced signal is converted into a non-interlaced signal.

FIGS. 6 and 7 illustrate different manners of conversion from an interlaced signal into another interlaced signal. More particularly, FIG. 6 illustrates a manner of conversion wherein input and output fields correspond to each other, and FIG. 7 illustrates another manner of conversion wherein input and output fields are reverse to each other.

In the conversion illustrated in FIG. 6, in an odd-numbered field, an offset of 0.5 is provided to the output video signal. As a result, the first line OO0 of the odd-numbered field after conversion is positioned in the middle between the first line I0 and the next line I2 before the conversion, and pixel data of the line OO0 are produced from average values of pixel data of the line I0 and the line I2. The line OO1 having a distance of 1.2 from the line OO0 has a distance of 0.7 (=1.2−0.5) from the line I2 and has a distance of 0.3 (=1.0−0.7) from the line I4. Accordingly, pixel data of the line OO1 are produced from sums of values obtained by weighting the pixel data of the line I2 with 0.3 and values obtained by weighting the pixel data of the line I4 with 0.7.

In an even-numbered field, an offset value of Delta/2 is provided to the first line OE0 after conversion. As a result, the distance of the line OE0 from the line I1 is 0.6 (=Delta/ 2), and the distance of the line OE0 from the line I3 is 0.4 (=1.0−0.6). As a result, pixel data of the line OE0 are produced from sums of values obtained by weighting the pixel data of the line I1 with 0.4 and values obtained by weighting the pixel data of the line I3 with 0.6. The line OE1 has a distance of 1.2 from the line OE0. Accordingly, the line OE1 has a distance of 0.8 (=1.2−0.4) from the line I3 and has a distance of 0.2 (=1.0−0.8) from the line I5. Accordingly, pixel data of the line OE1 are produced from sums of values obtained by weighting the pixel data of the line I3 with 0.2 and values obtained by weighting the pixel data of the line I5 with 0.8.

On the other hand, when a video signal of an even-numbered field is to be outputted in accordance with an inputted video signal of an odd-numbered field as seen in FIG. 7, an offset value of 0.5+Delta/2 is provided to the video signal of the even-numbered field to be outputted. As a result, the first line OO0 of the even-numbered field to be outputted has a distance of 0.1 (=0.5+0.6=1.0) from the second line I2 of the odd-numbered field before conversion, and has a distance of 0.9 (=1.0–0.1) from the line I4. Accordingly, pixel data of the line OO0 are produced from sums of values obtained by weighting the pixel data of the line I2 with 0.9 and values obtained by weighting the pixel data of the line I4 with 0.1. The line OO1 has a distance of 0.3 (=1.2–0.9) from the line I4 and has a distance of 0.7 (=1.0–0.3) from the line I6. Accordingly, pixel data of the line OO1 are produced from sums of values obtained by weighting the pixel data of the line I4 with 0.7 and values obtained by weighting the pixel data of the line I6 with 0.3.

In order to produce a video signal of an odd-numbered field after conversion from a video signal of an even-numbered field before conversion, the offset value is set to 0. Accordingly, the first line OE0 of the odd-numbered field after conversion has a distance of 0 from the first line I1 before conversion. As a result, pixel data of the line OE0 are produced from the pixel data of the line I1. The line OE1 having a distance of 1.2 from the line OE0 has a distance of 0.2 (=1.2–1.0) from the line I3 and has a distance of 0.8 (=1.0–0.2) from the line I5. Accordingly, pixel data of the line OE1 are produced from sums of values obtained by weighting the pixel data of the line I3 with 0.8 and values obtained by weighting the pixel data of the line I5 with 0.2.

Since the information processing apparatus of the present embodiment performs both-field processing in this manner, pixel data produced in such a manner as described above and outputted from the adder 63 of the vertical linear interpolation circuit 85 are alternately written into the field memory 34 or the field memory 35 for each field.

In particular, the switch 33 is switched in response to the write side field switching signal (FIG. 8A) such that, when the write side field switching signal has the high level, the switch 33 is switchably connected to the contact "a" side, but when the write side field switching signal has the low level, the switch 33 is switchably connected to the contact "b" side. As a result, the write side memory control signal (enable signal) is supplied to the field memory 34 when the write side field switching signal has the high level, but is supplied to the field memory 35 when the write side field switching signal has the low level. Accordingly, pixel data of the individual fields of the input video signal are alternately written into the field memory 34 and the field memory 35 after they undergo linear interpolation processing. The write address then is outputted from the address generation circuit 71.

Figure 8:
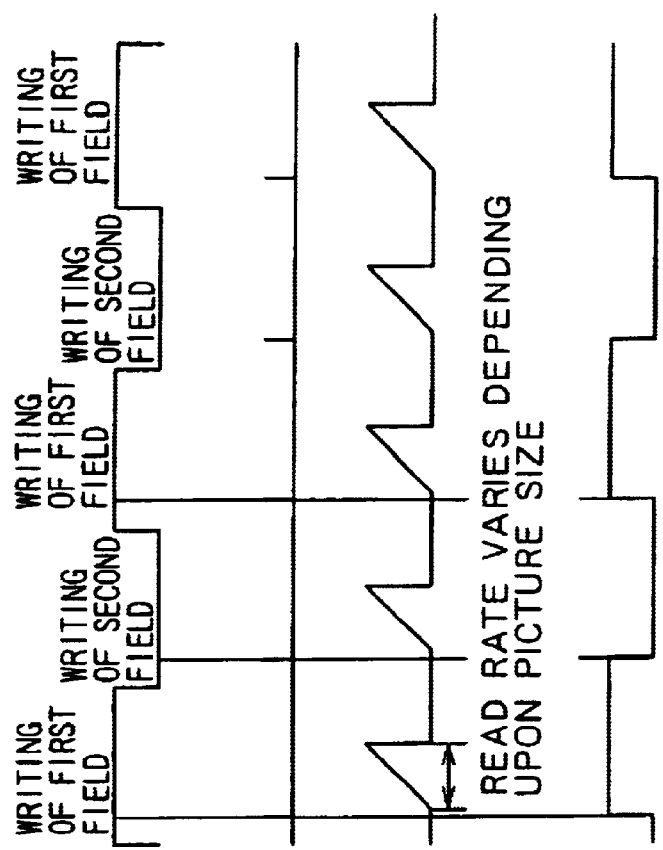
FIGS. 8A through 8D are timing charts each illustrating operation of the image processing apparatus of FIG. 1.

Meanwhile, in response to a read side readout start pulse (FIG. 8B) generated by the start position detection circuit 31, the D-type flip-flop 32 latches the write side field switching signal (FIG. 8A) and produces a read side field switching signal (FIG. 8D). When the read side field switching signal has the high level, the switch 37 and the switch 36 are switchably connected to the respective contact "b" side, but when the read side field switching signal has the low level, the switch 37 and the switch 36 are switchably connected to the respective contact "a" side. Accordingly, when the read side field switching signal (FIG. 8D) has the high level, the read side memory control signal (enable signal) is supplied to the field memory 35, but when the read side field switching signal has the low level, the read side memory control signal (enable signal) is supplied to the field memory 34. Consequently, while writing into the field memory 34 is being processed, data are read out from the other field memory 35 and outputted from the contact "b" of the switch 36. On the other hand, while writing into the field memory 35 is being processed, data are read out from the field memory 34 and outputted from the contact "a" of the switch 36. The read address (FIG. 8C) to the field memory 34 or 35 is supplied from a circuit not shown.

Thus, when an input video signal of a frequency of 60 Hz is converted into an output video signal of another frequency of 50 Hz, pixel data of the same field are read out twice successively for each fixed period as described above, and consequently, occurrence of passing is prevented.

It is to be noted that a providing medium with which a computer program for performing such processing as described above is provided to a user may be a storage medium such as magnetic disk, a CD-ROM or a solid state memory or a communication medium such as a network or a communications satellite.

While a preferred embodiment of the present invention has been described using specific terms, such description is for illustrative purposes only, and it is to be understood that changes and variations may be made without departing from the spirit or scope of the following claims.

What is claimed is:

1. An image processing device for converting an input image signal exhibiting one of interlace and progressive scan format into an output image signal exhibiting the other of said interlace and progressive scan format, with the output image having an output size represented by a number of lines and/or a number of pixels in each line, equal to or different from an input image size represented by the number of lines and/or the number of pixels in each line of the input image, comprising:

means for detecting format conversion of the input image signal format to the output image signal format and for detecting size conversion of the input image size to the output image size;

supply means for supplying one of plural predetermined initial values in response to the detected format and size conversion;

coefficient generating means for generating a vertical interpolating coefficient whose value is dependent upon said predetermined initial value supplied by said supply means; and interpolating means for multiplying pixel data of said input image by the generated coefficient to produce output image pixel data.

2. The image processing device of claim 1, further comprising storage means for storing the output image pixel data; and control means for controlling writing of said output image pixel data into and reading of said output image pixel data from said storage means.

3. The image processing device of claim 1, wherein said input image includes horizontal lines; and said predetermined initial values include a first value equal to 0 times the distance between said horizontal lines, a second value equal to 0.5 times said distance, a third value that is a function of ½ the reciprocal of the raster size conversion of the input image, and a fourth value that is a function of said second value plus said third value.

4. The image processing device of claim 1, wherein said detecting means is operable to detect if the conversion of said input image signal to said output image signal is interlace to progressive scan, progressive scan to interlace, odd-field to odd-field, even-field to even-field, odd-field to even-field, or even-field to odd-field conversion.

5. The image processing device of claim 1, wherein said interpolating means comprises vertical interpolating means for producing pixel data of said output image as a function of pixels in adjacent lines of a field in said input image.

6. An image processing method for converting an input image signal exhibiting one of interlace and progressive scan format into an output image signal exhibiting the other of said interlace and progressive scan format, with the output image having an output image size represented by a number of lines and/or a number of pixels in each line, equal to or different from an input image size represented by the number of lines and/or the number of pixels in each line of the input image, comprising the steps of:

detecting format conversion of the input image format to the output image format and size conversion of the input image size to the output image size;

supplying one of plural predetermined initial values in response to the detected format and size conversion;

generating a vertical interpolating coefficient whose value is dependent upon said supplied, predetermined initial value; and multiplying pixel data of said input image by the generated coefficient to produce output interpolated image pixel data.

7. The image processing method of claim 6, further comprising the steps of storing the output image pixel data in a storage device; and controlling writing of said output image pixel data into and reading of said output image pixel data from said storage device.

8. The image processing method of claim 6, wherein said input image includes horizontal lines; and said predetermined initial values include a first value equal to 0 times the distance between said horizontal lines, a second value equal to 0.5 times said distance, a third value that is a function of ½ the reciprocal of the raster size conversion of the input image, and a fourth value that is a function of said second value plus said third value.

9. The image processing method of claim 6, wherein said step of detecting detects if the conversion of said input image signal to said output image signal is interlace to progressive scan, progressive scan to interlace, odd-field to odd-field, even-field to even-field, odd-field to even-field, or even-field to odd-field conversion.

10. The image processing method of claim 6, wherein said output interpolated image pixel data is vertically interpolated pixel data produced as a function of pixels in adjacent lines of a field in said input image.

11. A medium for providing a computer-readable program to control a processor to execute a program for converting an input image signal exhibiting one of interlace and progressive scan format into an output image signal exhibiting the other of said interlace and progressive scan format, with the output image having an output image size represented by a number of lines and/or a number of pixels in each line, equal to or different from an input image size represented by the number of lines and/or the number of pixels in each line of the input image, comprising the steps of:

detecting format conversion of the input image format to the output image format and size conversion of the input image size to the output image size;

supplying one of plural predetermined initial values in response to the detected format and size conversion;

generating a vertical interpolating coefficient whose value is dependent upon said supplied, predetermined initial value; and multiplying pixel data of said input image by the generated coefficient to produce output interpolated image pixel data.

12. The medium of claim 11, wherein the program further comprises the steps of storing the output image pixel data in a storage device; and controlling writing of said output image pixel data into and reading of said output image pixel data from said storage device.

13. The medium of claim 11, wherein said input image includes horizontal lines; and said predetermined initial values include a first value equal to 0 times the distance between said horizontal lines, a second value equal to 0.5 times said distance, a third value that is a function of ½ the reciprocal of the raster size conversion of the input image, and a fourth value that is a function of said second value plus said third value.

14. The medium of claim 11, wherein said step of detecting detects if the conversion of said input image signal to said output image signal is interlace to progressive scan, progressive scan to interlace, odd-field to odd-field, even-field to even-field, odd-field to even-field, or even-field to odd-field conversion.

15. The medium of claim 11, wherein said output interpolated image pixel data is vertically interpolated pixel data produced as a function of pixels in adjacent lines of a field in said input image.

\* \* \* \* \*